US009462463B2

(12) United States Patent
Da et al.

(10) Patent No.: US 9,462,463 B2
(45) Date of Patent: Oct. 4, 2016

(54) METHOD OF CONTROLLING STATES OF MOBILE NODE AND VERIFIER THEREIN FOR RECEIVING SECRET KEY

(71) Applicants: Bin Da, Beijing (CN); Wei Wang, Beijing (CN); Haihua Yu, Beijing (CN); Yan Sun, Beijing (CN)

(72) Inventors: Bin Da, Beijing (CN); Wei Wang, Beijing (CN); Haihua Yu, Beijing (CN); Yan Sun, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 726 days.

(21) Appl. No.: 13/896,671

(22) Filed: May 17, 2013

(65) Prior Publication Data

US 2013/0336485 A1  Dec. 19, 2013

(30) Foreign Application Priority Data

Jun. 13, 2012  (CN) .......................... 2012 1 0194518

(51) Int. Cl.
| | |
|---|---|
| *H04K 1/00* | (2006.01) |
| *H04W 12/04* | (2009.01) |
| *H04L 29/08* | (2006.01) |

(52) U.S. Cl.
CPC ............ *H04W 12/04* (2013.01); *H04L 67/104* (2013.01); *H04L 67/1091* (2013.01)

(58) Field of Classification Search
CPC .......................... H04L 67/104; H04L 67/1091
USPC ....................................................... 380/270
See application file for complete search history.

(56) References Cited

U.S. PATENT DOCUMENTS

| | | | |
|---|---|---|---|
| 7,522,639 B1 | 4/2009 | Katz | |
| 7,656,831 B2 | 2/2010 | Gao et al. | |
| 7,852,816 B2 | 12/2010 | Jung | |
| 2002/0037699 A1 | 3/2002 | Kobayashi et al. | |
| 2003/0210787 A1* | 11/2003 | Billhartz ............. | H04L 63/0435 380/270 |
| 2006/0028984 A1 | 2/2006 | Wu et al. | |
| 2008/0125190 A1 | 5/2008 | Jan et al. | |
| 2008/0155265 A1* | 6/2008 | Yi et al. .................. | H04L 9/085 713/180 |

FOREIGN PATENT DOCUMENTS

| | | |
|---|---|---|
| JP | 2013-021499 | 1/2013 |
| WO | WO 2013/008939 A1 | 1/2013 |

* cited by examiner

*Primary Examiner* — Arvin Eskandarnia
(74) *Attorney, Agent, or Firm* — Oblon, McClelland, Maier & Neustadt, L.L.P

(57) ABSTRACT

Disclosed are a verifier used in a mobile node and a method of controlling plural states of the mobile node. The verifier comprises a secret key receiving part configured to listen and receive at least one secret key from at least one secret key transmitter in an area limited Ad-hoc network; a secret key stamp generating part configured to perform calculation on the at least one secret key according to a predetermined verification rule so as to generate a secret key stamp; and a secret key stamp verifying part configured to compare the secret key stamp and a predetermined standard value, wherein, if the secret key stamp is equal to the predetermined standard value, then the secret key is determined as valid, otherwise, the secret key is determined as invalid.

11 Claims, 7 Drawing Sheets

METHOD OF CONTROLLING STATES OF MOBILE NODE AND VERIFIER THEREIN FOR RECEIVING SECRET KEY

BACKGROUND OF THE INVENTION

1. Field of the Invention

The present invention relates to an Ad-hoc network, and more particularly relates to an area limited Ad-hoc network and data transfer in the area limited Ad-hoc network.

2. Description of the Related Art

An Ad-hoc network is a kind of wireless multi-hop network. Compared to a conventional wireless network, the Ad-hoc network is not dependent on any fixed infrastructure and administration center. That is to say, the Ad-hoc network is temporarily formed by a group of independent mobile nodes (for example, notebook computers or personal digital assistants), and according to cooperation between the mobile nodes and self-organization of themselves, network connection is kept and data transfer is achieved. A conventional Ad-hoc network does not have a predetermined (for example, artificially defined) boundary to limit (define) an area; in general, the area is limited by a maximum transfer distance (length) of the Ad-hoc network.

From a viewpoint of considering communications security and the like, Ricoh Co., Ltd. has made some studies on an area limited Ad-hoc network, and has proposed achieving area limitation by using, for example, infrared rays (IR), Near Field Communications (NFC), ultrasonic waves, microwaves, or the like. Since an area limited Ad-hoc network has a predetermined boundary, compared to the conventional Ad-hoc network, a mobile node may enter or exit from the area, and communications may be carried out between mobile nodes only located in the same area. As a result, how to determine whether a mobile node is located in an area limited Ad-hoc network as well as how to achieve energy (electric power) consumption optimized data transfer between mobile nodes located in the same area limited Ad-hoc network becomes a problem that needs to be solved at present.

SUMMARY OF THE INVENTION

In order to solve the above problem, according to one aspect of the present invention, a verifier used in a mobile node is provided. The verifier comprises a secret key receiving part configured to listen and receive at least one secret key from at least one secret key transmitter in an area limited Ad-hoc network; a secret key stamp generating part configured to perform calculation on the at least one secret key according to a predetermined verification rule so as to generate a secret key stamp; and a secret key stamp verifying part configured to compare the secret key stamp and a predetermined standard value, wherein, if the secret key stamp is equal to the predetermined standard value, then the secret key is determined as valid, otherwise, the secret key is determined as invalid.

Furthermore, according to another aspect of the present invention, a method of controlling plural states of a mobile node having a data transceiver and an area determiner is provided. The method comprises the following steps, namely:

a step of defining the plural states as an active state, a listening state, an enabling state, and a sleeping state, wherein, in the active state, the data transceiver and the area determiner are turned on; in the listening state, the data transceiver is turned off, the area determiner is turned on, and the mobile node is located in an area limited Ad-hoc network; in the enabling state, the data transceiver is turned off, the area determiner is turned on, and the mobile node is not located in the area limited Ad-hoc network; and in the sleeping state, the data transceiver and the area determiner are turned off;

a step of determining by the area determiner whether the mobile node is located in the area limited Ad-hoc network;

a step of controlling, when the mobile node is located in the area limited Ad-hoc network and needs to perform data transfer, the mobile node to enter the active state, and after the data transfer finishes, to enter the listening state; and a step of controlling, when the mobile node leaves from the area limited Ad-hoc network during a data transfer process in the active state, the mobile node to interrupt the data transfer process and to enter the enabling state.

In a case in which the area determiner is turned on, it listens and receives at least one secret key from at least one secret key transmitter in the area limited Ad-hoc network, performs calculation on the at least one secret key according to a predetermined verification rule so as to generate a secret key stamp, and compares the secret key stamp and a predetermined standard value. If the secret key stamp is equal to the predetermined standard value, then it is determined that the secret key stamp is valid, and the mobile node is located in the area limited Ad-hoc network, otherwise, it is determined that the secret key stamp is invalid, and the mobile node is not located in the area limited Ad-hoc network.

Moreover, according to still another aspect of the present invention, a carrier medium storing a program representing a sequence of instructions is provided. The program, when executed by a computer included in a collaboration processing apparatus that is connected to a plurality of electronic apparatuses, receives a request from an application installed in the collaboration processing apparatus, and controls the electronic devices based on the received request to perform a collaboration process by causing the application and the electronic devices to collaborate. The instructions cause the computer to carry out the respective steps of the above method.

According to the above verifier and method, it is possible to achieve multi-node synchronization and energy consumption optimized data transfer in an area limited Ad-hoc network.

DETAILED DESCRIPTION OF THE PREFERRED EMBODIMENTS

Hereinafter, various embodiments of the present invention will be concretely described with reference to the drawings. However it should be noted that the same symbols, which are in the specification and the drawings, stand for constructional elements having the basically-same function and structure, and repeated explanations for the constructional elements are omitted.

As described above, since a conventional Ad-hoc network does not have a predetermined boundary, a mobile node does not need to determine whether it is located in an area. In the present invention, in order to determine whether a mobile node is located in an area limited Ad-hoc network, an area determiner is installed in the mobile node. The area determiner determines, on the basis of a signal received from a secret key transmitter in the area limited Ad-hoc network, whether the mobile node is located in the area limited Ad-hoc network. The area determiner may be achieved by any proper way in the art. In an embodiment of the present invention, the area determiner is embodied as a verifier for receiving a secret key (also called "area secret key").

Figure 1:
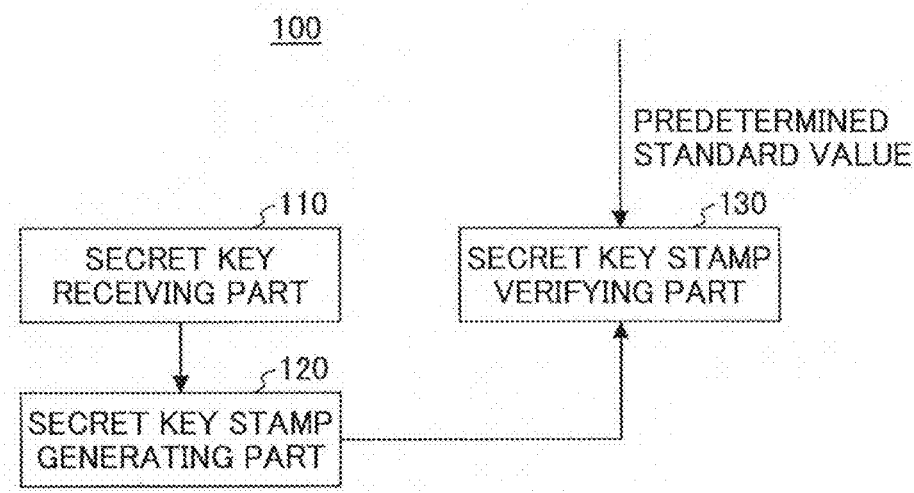
FIG. 1 is a block diagram of a verifier of a mobile node for receiving a secret key, according to an embodiment of the present invention.

FIG. 1 is a block diagram of a verifier of a mobile node for receiving a secret key, according to an embodiment of the present invention.

As shown in FIG. 1, a verifier 100 for receiving a secret key comprises a secret key receiving part 110, a secret key stamp generating part 120, and a secret key stamp verifying part 130. The secret key receiving part 110 is configured to listen and receive at least one secret key transmitted by at least one secret key transmitter in an area limited Ad-hoc network. The secret key stamp generating part 120 is configured to perform calculation on the received secret key according to a predetermined verification rule so as to generate a secret key stamp. The secret key stamp verifying part 130 is configured to compare the generated secret key stamp and a predetermined standard value. If the generated secret key stamp is equal to the predetermined standard value, then the generated secret key stamp is determined as valid; otherwise, it is determined as invalid. In what follows, the respective parts of the verifier 100 for receiving a secret key will be concretely described on the basis of FIG. 2.

Figure 2:
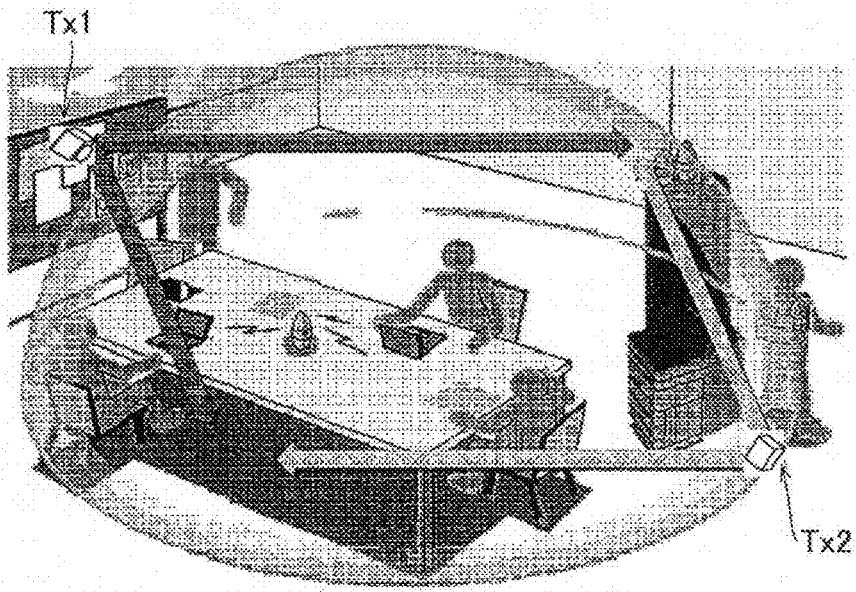
FIG. 2 illustrates an example of an area limited Ad-hoc network according to an embodiment of the present invention.

FIG. 2 illustrates an example of an area limited Ad-hoc network according to an embodiment of the present invention.

In particular, FIG. 2 shows an area limited Ad-hoc network A in which the area is limited (defined) by two infrared transmitters Tx1 and Tx2, and the infrared transmitters Tx1 and Tx2 synchronously transmit secret keys in a predetermined time interval, respectively. The predetermined time interval may be regular (for example, a fixed time period), or may be irregular. When the secret key receiving part 110 of a mobile node works, it continuously listens and receives at least one secret key transmitted by at least one of the infrared transmitters Tx1 and Tx2 in the area limited Ad-hoc network A. Here, an example of a structure of a secret key contains a transmitter number, a sequence number of a current transmission frame, a random number, and other information. Hereinafter, this kind of secret key is called a "heavy secret key". Since the heavy secret key contains a lot of information, its safety is high; however, the corresponding system overhead is relatively large. Another example of a structure of a secret key only contains a transmitter number and a sequence number of a current transmission frame, i.e., does not contain a random number and other information. Hereinafter, this kind of secret key is called a "slight secret key". As for the slight secret key, compared to the heavy secret key, the corresponding system overhead decreases; however, its safety is lower. The slight secret key and the heavy secret key are two kinds of exemplary secret keys proposed in the present invention. It should be noted that actually a secret key may adopt a more flexible structure; for example, it may only contain a transmitter number.

In response to actual needs, it is possible to cause the secret key transmitter to send the heavy secret key, the slight secret key, or any other secret key having any other proper structure. In an embodiment of the present invention, secret keys having different structures are transmitted in a mixed manner. In what follows, an example of transmitting these kinds of secret keys will be concretely described on the basis of FIG. 3.

Figure 3:
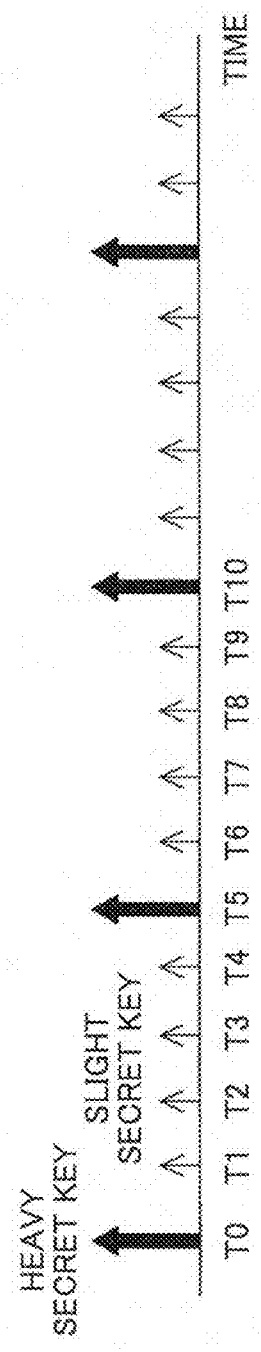
FIG. 3 illustrates an example of how to transmit secret keys by a secret key transmitter, according to an embodiment of the present invention.

FIG. 3 illustrates an example of how to transmit secret keys by a secret key transmitter, according to an embodiment of the present invention.

As shown in FIG. 3, a secret key transmitter transmits a heavy secret key at the time point T0, and then, at the time point T1 after one time interval, it transmits a slight secret key. At the following time points T2 to T4, the secret key transmitter transmits slight secret keys, respectively. Then, at the time point T5, the secret key transmitter transmits a heavy secret key again, and at the following time points T6 to T9, it transmits slight secret keys, respectively. By parity of reasoning, at time points after the time point T9, they are the same. Since the secret key transmitter transmits a slight secret key mostly, the corresponding system overhead in total is relatively small. On the other hand, the secret key transmitter transmits a heavy secret key every five time intervals; therefore, although wrong communications occur between two mobile nodes outside and inside an area limited Ad-hoc network, the communications may be interrupted after at most five time intervals. As a result, a high level of security can be guaranteed.

Referring to FIG. 2 again, when a mobile node enters the limited Ad-hoc network A shown in this figure, the secret key receiving part 110 receives secret keys transmitted by the infrared transmitters Tx1 and Tx2. Then the secret key stamp generating part 120 performs calculation on the received secret keys according to any possible verification rule so as to generate a secret key stamp. For example, the secret key generating part 120 may carry out addition, subtraction, average, mean square, or any other proper calculation with regard to the secret keys received from the infrared transmitters Tx1 and Tx2. Hereinafter, a secret key stamp generated when a secret key is a heavy secret key is called a "heavy secret key stamp", and a secret key stamp generated when a secret key is a slight secret key is called a "slight secret key stamp". Next the secret key stamp verifying part 130 compares the generated secret key stamp and a predetermined standard value. In a case where the generated secret key stamp is equal to the predetermined standard value, the generated secret key stamp is determined as valid; otherwise, it is determined as invalid. In what follows, the comparison of the secret key stamp verifying part 130 will be concretely described.

In general, a predetermined standard value refers to a secret key stamp that should be obtained by using the secret key receiving part 110 and the secret key stamp generating part 120 when a mobile node has been located in the area limited Ad-hoc network A. For example, it is assumed that the transmitter numbers of the infrared transmitters Tx1 and Tx2 are 1 and 2, respectively, a predetermined verification rule adopted by the secret key stamp generating part 120 is addition, and the infrared transmitters Tx1 and Tx2 transmit secret keys in a fixed time interval that is 0.1 seconds, respectively. In this case, if a secret key has a structure that only contains a transmitter number, then the corresponding secrete key stamp (i.e., the predetermined standard value) should be a constant 3 (i.e., the transmitter number of Tx1 plus the transmitter number of Tx2). If a slight secret key is adopted, and the sequence numbers of frames transmitted by any one of the infrared transmitters are integer numbers progressively increased by 1 from 1, then the corresponding secret key stamp is a continuously changed value that changes, for example, according to a rule of progressively increasing by 2. In particular, if the sum of the transmitter numbers and the sequence numbers of the frames are added, respectively, then at the time point T0, the corresponding secret key stamp should be 5; at the time point T1, it should be 7; at the time point T2, it should be 9; at a time point T3, it should be 11; and so on. In the above description, the predetermined verification rule is assumed to be addition. However, in a case where the secret key stamp generating part 120 adopts another predetermined verification rule (i.e., one other than addition) to generate a secret key stamp, if a secret key has a structure only containing a transmitter number, then the corresponding secret key stamp may be another constant. In a case of a slight secret key, the corresponding secret key stamp may continuously change according another rule as time goes on. Here it should be noted that a mobile node belonging to an area limited Ad-hoc network knows in advance that the area limited Ad-hoc network is limited (formed) by what kind(s) of transmitter(s), and also knows the corresponding transmitter number(s) of the transmitter(s) as well as a predetermined verification rule for generating a secret key stamp. Also a predetermined standard value corresponding to the area limited Ad-hoc network is set in the mobile node in advance. As a result, when the mobile node enters the area limited Ad-hoc network, for example, the area limited Ad-hoc network A shown in FIG. 2, by comparing a secret key stamp generated by the secret key stamp generating part 120 and the predetermined standard value, it is determined whether the generated secret key stamp is valid. It is easily understood that if the generated secret key stamp is equal to the predetermined standard value, then that means the mobile node has received the secret keys transmitted by the infrared transmitters Tx1 and Tx2, i.e., the mobile node has entered the area limited Ad-hoc network limited by the infrared transmitters Tx1 and Tx2. After that, if a secret key stamp generated by the mobile node is not equal to the predetermined standard value, then that means the mobile node could not simultaneously receive the secret keys transmitted by the infrared transmitters Tx1 and Tx2 later, i.e., the mobile node has left from the area limited Ad-hoc network limited by the infrared transmitters Tx1 and Tx2.

So far, the comparisons of the secret key stamp verifying part 130 in a case in which a secret key has a structure only containing a transmitter number and in a case in which a secret key is a slight secret key have been described. However, if a secret key is a heavy secret key, then the corresponding circumstance is a little different. Since a heavy secret key includes a random number, the above-mentioned predetermined standard value is not a constant or a continuously changed value that changes according to a certain rule, but it is a randomly changed value. Therefore, it is obvious that the above-mentioned predetermined standard value cannot be set in a mobile node in advance. Since it is apparent that mobile nodes located in a same area limited Ad-hoc network should have a same secret key stamp, in this case (in which a secret key is a heavy secret key), the mobile node may utilize a secret key stamp calculated by another mobile node located in the same area limited Ad-hoc network to serve as the predetermined standard value. In particular, the verifier 100 for receiving a secret key further comprises a secret key stamp receiving part 140 configured to receive a secret key stamp generated by another mobile node that has been located in the same area limited Ad-hoc network so as to let the received secret key stamp serve as the predetermined standard value for carrying out comparison. If the comparison result indicates that the secret key stamp generated by the mobile node is equal to the predetermined standard value, then that means the generated secret key stamp is valid, i.e., the mobile node has been located in the area limited Ad-hoc network in which the other mobile node has been located in. Here it should be noted that actually, if a secret key is a slight secret key or has a structure only containing a transmitter number, it is also possible to adopt the above means to determine whether a secret key stamp is valid.

In FIG. 2, only one area limited Ad-hoc network A is shown. Actually, plural area limited Ad-hoc networks may exist at the same time. The predetermined verification rules adopted by the plural area limited Ad-hoc networks for generating secret key stamps may be the same, or may be different. If the predetermined verification rules are the same, then that means the corresponding circumstance is basically the same as that in which only one area limited Ad-hoc network exists. However, if the predetermined verification rules are different, the circumstances are a little different. In particular, although plural predetermined verification rules have been set in a mobile node in advance, in a certain area limited Ad-hoc network, the mobile node does not know which predetermined verification rule should be selected for calculating a secret key stamp. As a result, an area verification rule number is further added into a secret key transmitted by at least one secret key transmitter. In this way, the mobile node may choose, on the basis of the received area verification rule number, a corresponding one from the predetermined verification rules so as to calculate a secret key stamp.

Here it should be noted that although the area limited Ad-hoc network A is limited by two infrared transmitters Tx1 and Tx2, the present invention is not limited to this. In fact, the area limited Ad-hoc network A may be limited by n (n is greater than or equal to 1) infrared transmitters, and the infrared transmitters may be replaced by microwave transmitters, ultrasonic transmitters, NFC (Near Field Communication) transmitters, or the like.

In general, a conventional mobile node includes a data transceiver, for example, a Wi-Fi or Bluetooth one, used for carrying out data transfer. As a result, the mobile node has two states, namely, a state of turning on the data transceiver and a state of turning off the data transceiver. In the above embodiments of the present invention, the area determiner is additionally installed in the mobile node, and this area determiner also has two states, namely, a turn-on state and a turn-off state. When both the data transceiver and the area determiner are turned on, the energy consumption of the mobile node is relatively large. As a result, how to define and control the states of a mobile node so as to reduce the energy consumption of data communications is a problem that needs to be solved.

In an embodiment of the present invention, a mobile node is defined to have the following states, namely, an active state, a listening state, an enabling state, and a sleeping state. In the active state, both a data transceiver and an area determiner are turned on. In the listening state, the data transceiver is turned off, the area determiner is turned on, and the mobile node is located in an area limited Ad-hoc network. In the enabling state, the data transceiver is turned off, the area determiner is turned on, and the mobile node is not located in the area limited Ad-hoc network. In the sleeping state, both the data transceiver and the area determiner are turned off. Furthermore, in both the listening state and the enabling state, a data node (a mobile node) keeps on listening to a signal from a secret key transmitter in the area limited Ad-hoc network, but does not carry out data transfer. That is to say, only in the active state, the data node may carry out data transfer.

Figure 4:
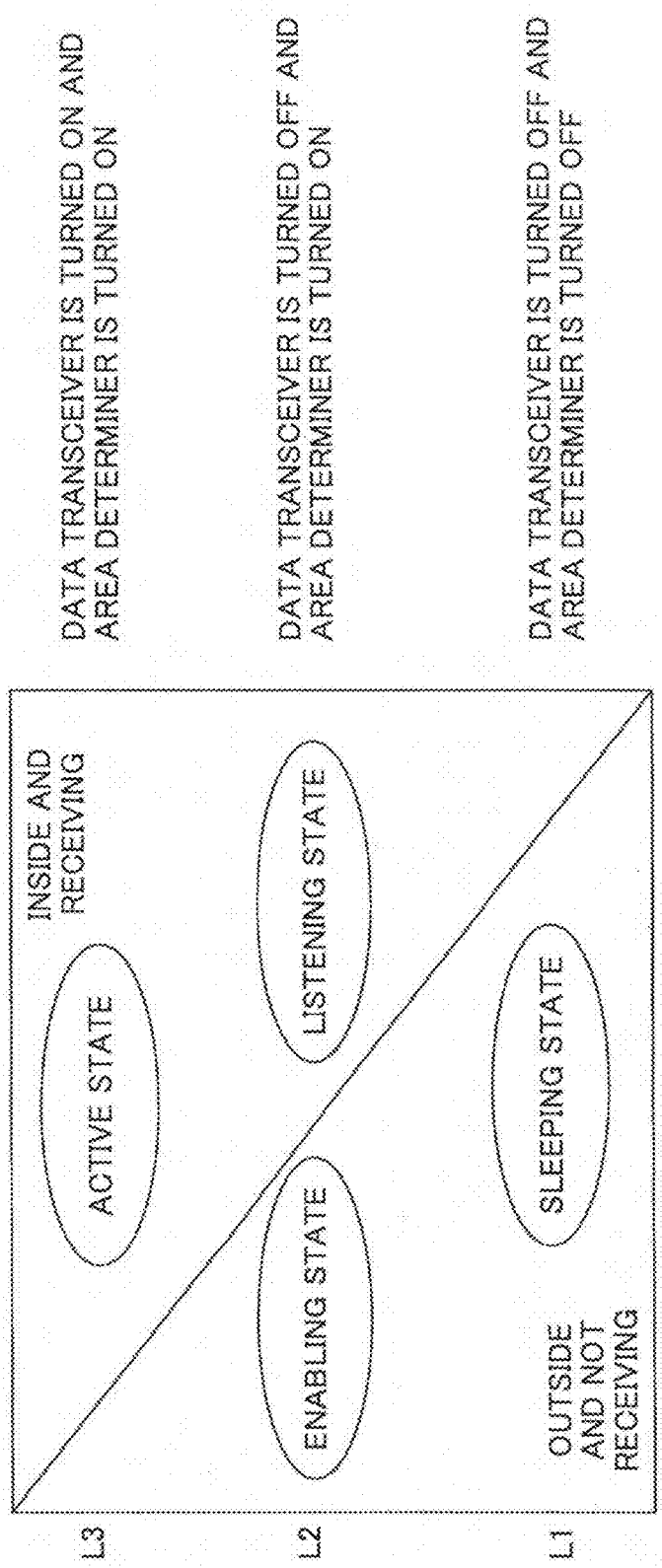
FIG. 4 illustrates energy consumption levels and states of a mobile node according to an embodiment of the present invention.

FIG. 4 illustrates energy consumption levels and states of a mobile node according to an embodiment of the present invention.

As shown in FIG. 4, the above four states correspond to three energy consumption levels. That is, the sleeping state has a first energy consumption level L1; the enabling state and the listening state have a second energy consumption level L2 (here it should be noted that these two states having this energy consumption level may enabling receiving a secret key); and the active state has a third energy consumption level L3 (L3>L3>L1). In what follows, transition conditions for the states of a mobile node will be concretely described on the basis of FIG. 5.

Figure 5:
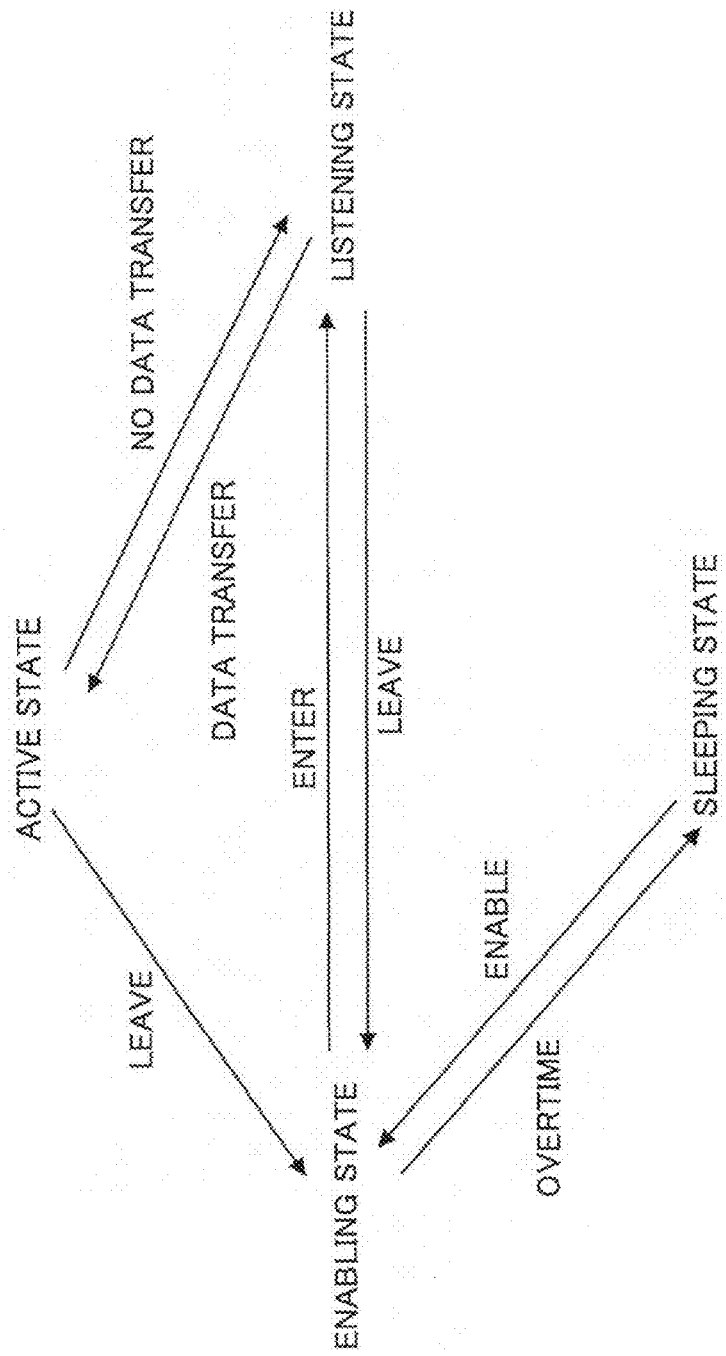
FIG. 5 illustrates transition conditions for states of a mobile node according to an embodiment of the present invention.

FIG. 5 illustrates transition conditions for states of a mobile node according to an embodiment of the present invention.

In the embodiments of the present invention, in order to reduce energy consumption when a mobile node carries out data communications, the mobile node is controlled to be in a state in which the energy consumption level is as low as possible. Therefore, when the mobile node does not need to carry out data transfer, a data transceiver thereof should be turned off so as to cause the mobile node to be in a listening state, an enabling state, or a sleeping state. As shown in FIG. 5, only when the mobile node is located in an area limited Ad-hoc network, is in the listening state, and needs to carry out data transfer, the mobile node is controlled to enter an active state, and after the data transfer finishes, to go back to the listening state. In the active state and the data transfer process, if the mobile node leaves from the area limited Ad-hoc network, then it is controlled to interrupt the data transfer, and to enter the enabling state. In addition, when the mobile node is in the enabling state, a counter thereof starts working. If the mobile node does not change its state (i.e., is still in the enabling state) until the counter counts up to a predetermined value, then the mobile node is forced to enter a sleeping state in which the energy consumption is lower, i.e., to stop listening to a signal transmitted by a secret key transmitter.

Furthermore, a determination result from an area determiner of the mobile node is a trigger by which the mobile node may be switched between the enabling state and the listening state. In particular, as described in the above embodiment, the area determiner is embodied as the verifier 100 for receiving a secret key. In a case in which the secret key verifying part 130 determines that a generated secret key stamp is invalid, if the mobile node is in the enabling state, then it is controlled to keep on staying in this state, and if the mobile node is in the listening state, then it is controlled to eater the enabling state. In a case in which the secret key verifying part 130 determines that a generated secret key stamp is valid, if the mobile node is in the listening state, then it is controlled to keep on staying in the listening state, and if the mobile is in the enabling state, then it is controlled to enter the listening state. As described above, the enabling state is a state in which the mobile node is not in the area limited Ad-hoc network, and may not receive data. As a result, in a case in which the mobile node is in this state, although it may receive a trigger for data transfer, it cannot directly enter the active state for performing the data transfer. However, when the mobile node is in the listening state in which the mobile node is in the area limited Ad-hoc network, and may receive data, it may repeatedly carry out a working process as shown in FIG. 6.

Figure 6:
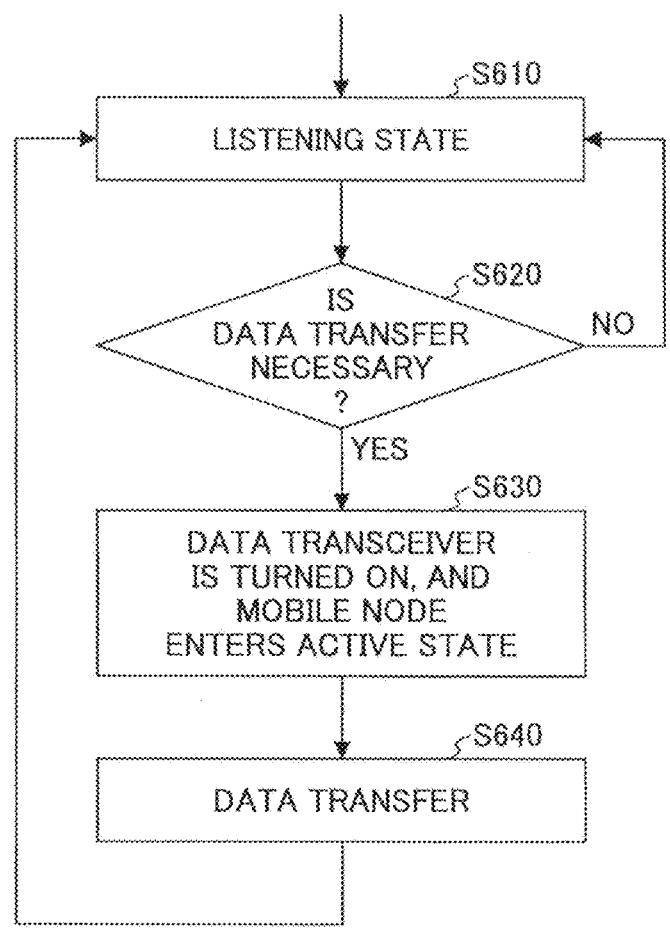
FIG. 6 illustrates a working process of a mobile node that is in a listening state, according to an embodiment of the present invention.

FIG. 6 illustrates a working process of a mobile node that is in a listening state, according to an embodiment of the present invention.

As shown in FIG. 6, in STEP S610, the mobile node is in the listening state, and keeps on listening to a secret key transmitted from a secret key transmitter in this state. Then, in STEP S620, the mobile node determines whether data transfer is necessary. If the data transfer is not necessary, then the working process goes back to STEP S610; otherwise, the working process goes to STEP S630. In STEP S630, a data transceiver of the mobile node is turned on so as to cause the mobile node to enter an active state. Next, in STEP S640, the mobile node performs the data transfer by using the data transceiver. After the data transfer finishes, the working process goes back to STEP S610, i.e., the mobile node enters the listening state again.

Figure 7:
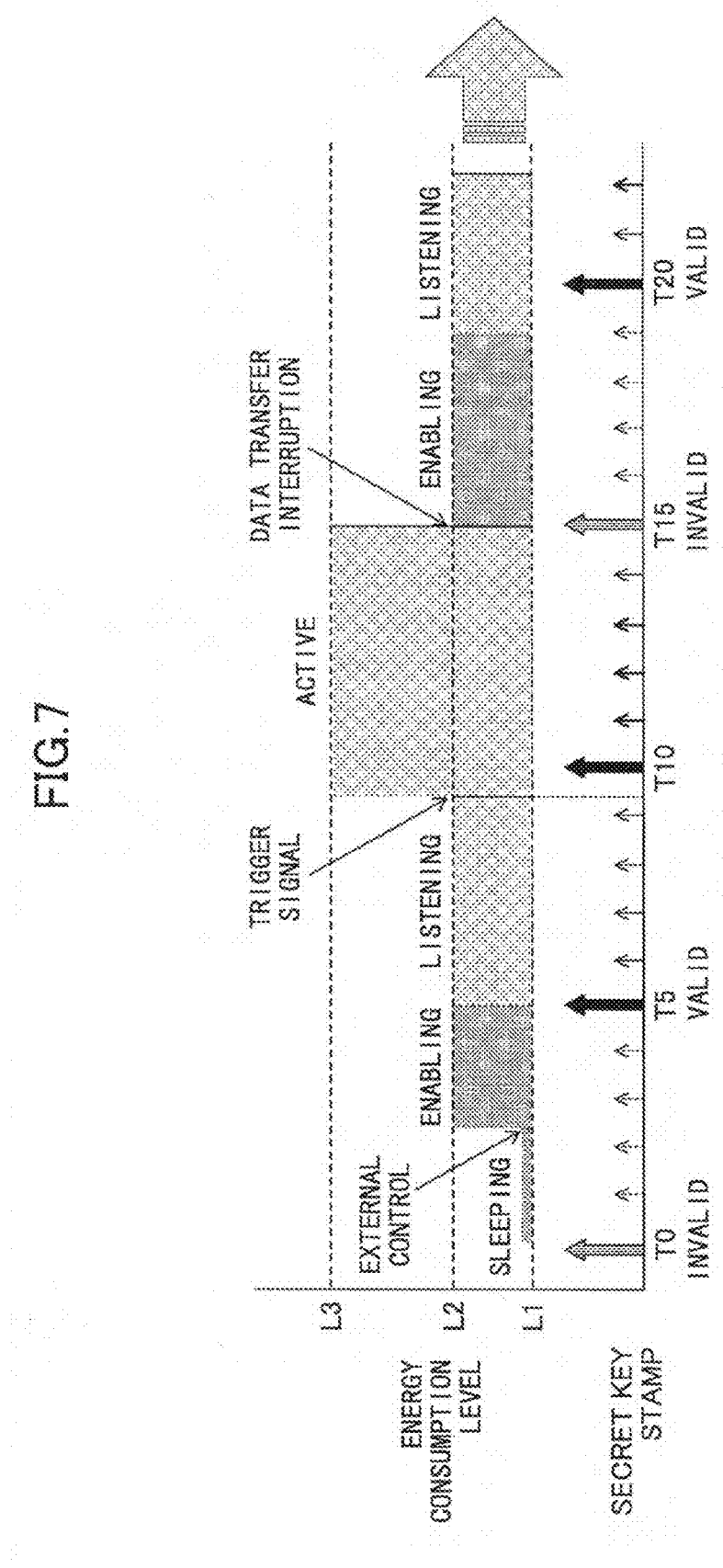
FIG. 7 illustrates an example of state transition of a single mobile node in a data transfer process, according to an embodiment of the present invention.
Figure 8:
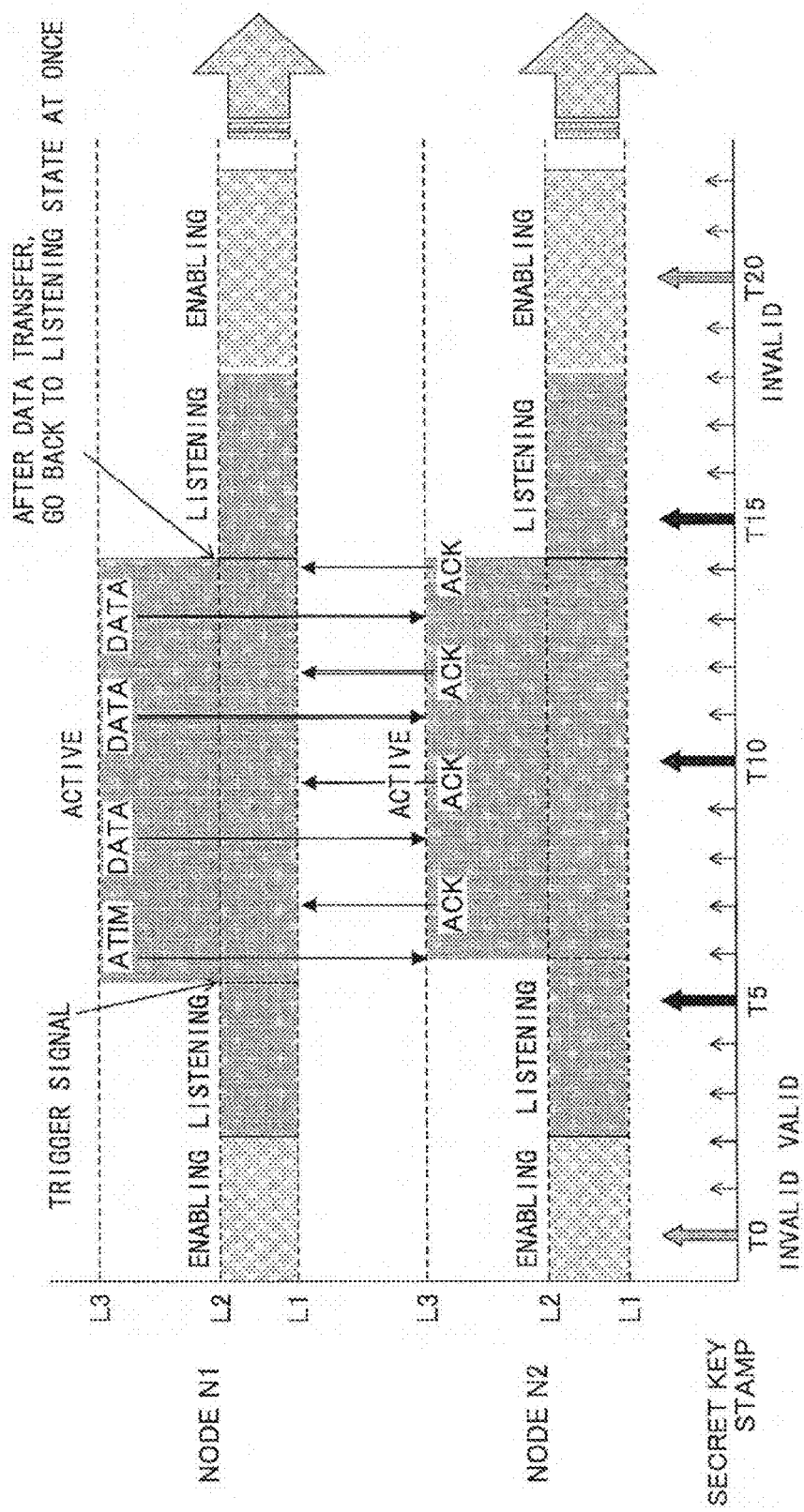
FIG. 8 illustrates an example of state transition of plural mobile nodes in a data transfer process, according to an embodiment of the present invention.

In what follows, examples of state transition of at least one mobile node in a data transfer process, according to embodiments of the present invention are concretely illustrated on the basis of FIGS. 7 and 8.

FIG. 7 illustrates an example of state transition of a single mobile node in a data transfer process, according to an embodiment of the present invention.

In particular, FIG. 7 shows the state transition of the single mobile node (hereinafter, called "node N") in a process of entering, from outside of an area limited Ad-hoc network (hereinafter, called "network W"), the network W, then performing data transfer in the network W, and then leaving from the network W. In this embodiment, at least one secret key transmitter transmits secret keys having different structures in a mixed way. That is, the secret transmitter sends a heavy secret key every five time intervals, and sends slight secret keys on the other time points. As shown in FIG. 7, at the beginning, the node N is in a sleeping state in which the energy consumption level is L1. Then, since a trigger such as an external control signal is received, an area determiner of the node N is turned on, and from this time point, the node N enters an enabling state in which the energy consumption is L2. According to the description in the above embodiments, in the sleeping state and the enabling state, a secret key stamp generated by the secret key stamp generating part 120 is invalid. After that, for example, at the time point t5, a generated secret key stamp becomes valid; this means that the node N has entered the network W, and has been in the listening state. In this listening state, the node N performs a working process as shown in FIG. 6. For example, in the time interval from the time point t9 to the time point t10, if a trigger signal for data transfer is received, then a data transceiver of the node N is turned on, and from this time point, the node N enters an active state in which the energy consumption level is L3 (highest), and starts carrying out the data transfer. In this embodiment, it is assumed that in the data transfer process, for example, at the time point t15, a generated secret key stamp becomes invalid. In this circumstance, it is possible to determine that the node N has left from the network W, and has become one that may not receive data. As a result, the data transceiver of the node A is turned off so as to interrupt the data transfer; in the meantime, the node N enters the enabling state in which the energy consumption is L2. After that, the node N keeps on listening to a secret key and generating a secret key stamp in this state, and when the generated secret key stamp becomes valid again, re-enters the network W.

FIG. 8 illustrates an example of state transition of plural mobile nodes in a data transfer process, according to an embodiment of the present invention.

In FIG. 8, state transition of a single mobile node is similar to that described on the basis of FIG. 7; therefore, the repeated description is omitted. Here only the difference between the circumstance of a single mobile node and that of plural mobile nodes is illustrated. As shown in FIG. 8, any one of two mobile nodes (hereinafter, called "nodes N1 and N2") may be switched between an enabling state and a listening state by utilizing a valid or invalid secret key stamp. When a mobile node, for example, the node N1 receives a trigger such as an external control signal or an internal event-based trigger (e.g., for data transfer), and needs to transfer data to the node N2, the node N1 enters an active state, then sends an Ad-hoc traffic indication message (ATIM) to the node N2 for notice, and then starts transferring the data. The ATIM may include the number of data segments needing to be transferred, an independent basic service set (IBSS) number, and the like. After the node N2 receives the ATIM-based notice, its data transceiver is turned on, and the node N2 enters an active state. As for each of the data segments transferred by the node N1, the node N2 needs to send back an acknowledge message (an ACK frame). After the data segments are transferred, the data transceivers of the nodes N1 and N2 are turned off, and each of the nodes N1 and N2 enters the listening state so as to reduce the energy consumption. In addition, as described above, in the embodiments of the present invention, a precondition under which the nodes N1 and N2 may perform data transfer with each other is such that their secret key stamps are valid. To state more clearly, the mutual data communications needs a same and valid secret key stamp.

Up to now, the present invention has been described in detail on the basis of the above embodiments. In the embodiments of the present invention, the format and structure of a secret key transmitted by a secret key transmitter are defined, and a secret key stamp generated from a secret key and a verifier of a mobile node for receiving a secret key are concretely described. The secret key stamp may be used to determine whether the corresponding mobile node is located in an area limited Ad-hoc network, to synchronize plural mobile nodes, and to trigger the state transition of the corresponding mobile node. In addition, in the embodiments of the present invention, four different states are defined for a mobile node, and a method of controlling the four states is given. In this way, it is possible to achieve the energy consumption optimized data communications.

Here it should be noted that the above respective embodiments are just exemplary ones, and the specific structure and operation of each of them is not used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on Chinese Priority Patent Application No. 201210194518.4 filed on Jun. 13, 2012, the entire contents of which are hereby incorporated by reference.

What is claimed is:

1. A verifier used in a mobile node, comprising:
circuitry configured to:
listen and receive at least one secret key from at least one secret key transmitter in an area limited Ad-hoc network;
perform calculation on the at least one secret key according to a predetermined verification rule so as to generate a secret key stamp; and
compare the secret key stamp and a predetermined standard value, wherein, when the secret key stamp is equal to the predetermined standard value, then the secret key is determined as valid, otherwise, the secret key is determined as invalid, wherein
when plural area limited Ad-hoc networks exist, then the plural area limited Ad-hoc networks adopt a same predetermined verification rule or different predetermined verification rules, and
when the plural area limited Ad-hoc networks adopt the different predetermined verification rules, then the at least one secret key further contains an area verification rule number for indicating another predetermined verification rule.

2. The verifier according to claim 1, wherein,
the at least one secret key contains a secret key transmitter number, a sequence number of a frame transmitted currently, and a random number; or contains the secret key transmitter number and the sequence number of the frame transmitted currently; or only contains the secret key transmitter number.

3. The verifier according to claim 1, wherein the circuitry is configured to:
receive a secret key stamp generated by another mobile node in a same area limited Ad-hoc network, wherein, the predetermined standard value is the secret key stamp generated by the another mobile node in the same area limited Ad-hoc network.

4. The verifier according to claim 2, wherein,
when the at least one secret key only contains the secret key transmitter number, then the predetermined standard value is a constant, and
when the at least one secret key contains the secret key transmitter number and the sequence number of the frame transmitted currently, then the predetermined standard value is a value that changes according to a predetermined rule as time goes on.

5. The verifier according to claim 1, wherein,
the at least one secret key transmitter in a same area limited Ad-hoc network simultaneously transmits the at least one secret key by using a predetermined time interval.

6. A method of controlling plural states of a mobile node having a data transceiver and an area determiner, comprising:
defining the plural states as an active state, a listening state, an enabling state, and a sleeping state, wherein, in the active state, the data transceiver and the area determiner are turned on; in the listening state, the data transceiver is turned off, the area determiner is turned on, and the mobile node is located in an area limited Ad-hoc network; in the enabling state, the data transceiver is turned off, the area determiner is turned on, and the mobile node is not located in the area limited Ad-hoc network; and in the sleeping state, the data transceiver and the area determiner are turned off;
determining by the area determiner whether the mobile node is located in the area limited Ad-hoc network;
controlling, when the mobile node is located in the area limited Ad-hoc network and needs to perform data transfer, the mobile node to enter the active state, and after the data transfer finishes, to enter the listening state; and
controlling, when the mobile node leaves from the area limited Ad-hoc network during a data transfer process in the active state, the mobile node to interrupt the data transfer process and to enter the enabling state,
wherein, in a case in which the area determiner is turned on, the area determiner listens and receives at least one secret key from at least one secret key transmitter in the area limited Ad-hoc network, performs calculation on the at least one secret key according to a predetermined verification rule so as to generate a secret key stamp, and compares the secret key stamp and a predetermined standard value, wherein, when the secret key stamp is equal to the predetermined standard value, then it is determined that the secret key stamp is valid, and the mobile node is located in the area limited Ad-hoc network, otherwise, it is determined that the secret key stamp is invalid, and the mobile node is not located in the area limited Ad-hoc network.

7. The method according to claim 6, wherein,
in a case in which the secret key stamp is determined as invalid, when the mobile node is in the enabling state, then the mobile node is controlled to keep on staying in the enabling state, and when the mobile node is in the listening state, then the mobile node is controlled to enter the enabling state; and
in a case in which the secret key stamp is determined as valid, when the mobile node is in the listening state, then the mobile node is controlled to keep on staying in the listening state, and when the mobile node is in the enabling state, then the mobile is controlled to enter the listening state.

8. The method according to claim 6, wherein,
when the mobile node is in the sleeping state, and receives an external trigger or an internal event-based trigger, then the mobile node enters the enabling state.

9. The method according to claim 6, wherein,
the mobile node has, when in the sleeping state, a first energy consumption level L1, when in the enabling state and the listening state, a second energy consumption level L2, when in the active state, a third energy consumption level L3, and L3>L2>L1.

10. A non-transitory computer-readable medium storing a program representing a sequence of instructions, the program which when executed by a computer included in a collaboration processing apparatus that is connected to a plurality of electronic devices, receives a request from an application installed in the collaboration processing apparatus, and controls the electronic devices based on the received request to perform a collaboration process by causing the application and the electronic devices to collaborate, the instructions cause the computer to carry out a method of controlling plural states of a mobile node having a data transceiver and an area determiner, the method comprising:
defining the plural states as an active state, a listening state, an enabling state, and a sleeping state, wherein, in the active state, the data transceiver and the area determiner are turned on; in the listening state, the data transceiver is turned off, the area determiner is turned on, and the mobile node is located in an area limited Ad-hoc network; in the enabling state, the data transceiver is turned off, the area determiner is turned on, and the mobile node is not located in the area limited Ad-hoc network; and in the sleeping state, the data transceiver and the area determiner are turned off;
determining by the area determiner whether the mobile node is located in the area limited Ad-hoc network;
controlling, when the mobile node is located in the area limited Ad-hoc network and needs to perform data transfer, the mobile node to enter the active state, and after the data transfer finishes, to enter the listening state; and
controlling, when the mobile node leaves from the area limited Ad-hoc network during a data transfer process in the active state, the mobile node to interrupt the data transfer process and to enter the enabling state,
wherein, in a case in which the area determiner is turned on, the area determiner listens and receives at least one secret key from at least one secret key transmitter in the area limited Ad-hoc network, performs calculation on the at least one secret key according to a predetermined verification rule so as to generate a secret key stamp, and compares the secret key stamp and a predetermined standard value, wherein, when the secret key stamp is equal to the predetermined standard value, then it is determined that the secret key stamp is valid, and the mobile node is located in the area limited Ad-hoc network, otherwise, it is determined that the secret key stamp is invalid, and the mobile node is not located in the area limited Ad-hoc network.

11. A verifier used in a mobile node, comprising:
circuitry configured to:
listen and receive at least one secret key from at least one secret key transmitter in an area limited Ad-hoc network;
perform calculation on the at least one secret key according to a predetermined verification rule so as to generate a secret key stamp; and
compare the secret key stamp and a predetermined standard value, wherein, when the secret key stamp is equal to the predetermined standard value, then the secret key is determined as valid, otherwise, the secret key is determined as invalid, wherein,
the at least one secret key contains a secret key transmitter number, a sequence number of a frame transmitted currently, and a random number; or contains the secret key transmitter number and the sequence number of the frame transmitted currently; or only contains the secret key transmitter number,
when the at least one secret key only contains the secret key transmitter number, then the predetermined standard value is a constant, and
when the at least one secret key contains the secret key transmitter number and the sequence number of the frame transmitted currently, then the predetermined standard value is a value that changes according to a predetermined rule as time goes on.

* * * * *